May 13, 1941.  I. H. WILSEY  2,241,938
APPARATUS FOR POPPING CORN
Filed Jan. 27, 1938  6 Sheets-Sheet 1

INVENTOR.
IRVEN H WILSEY
BY Flournoy Corey
ATTORNEY

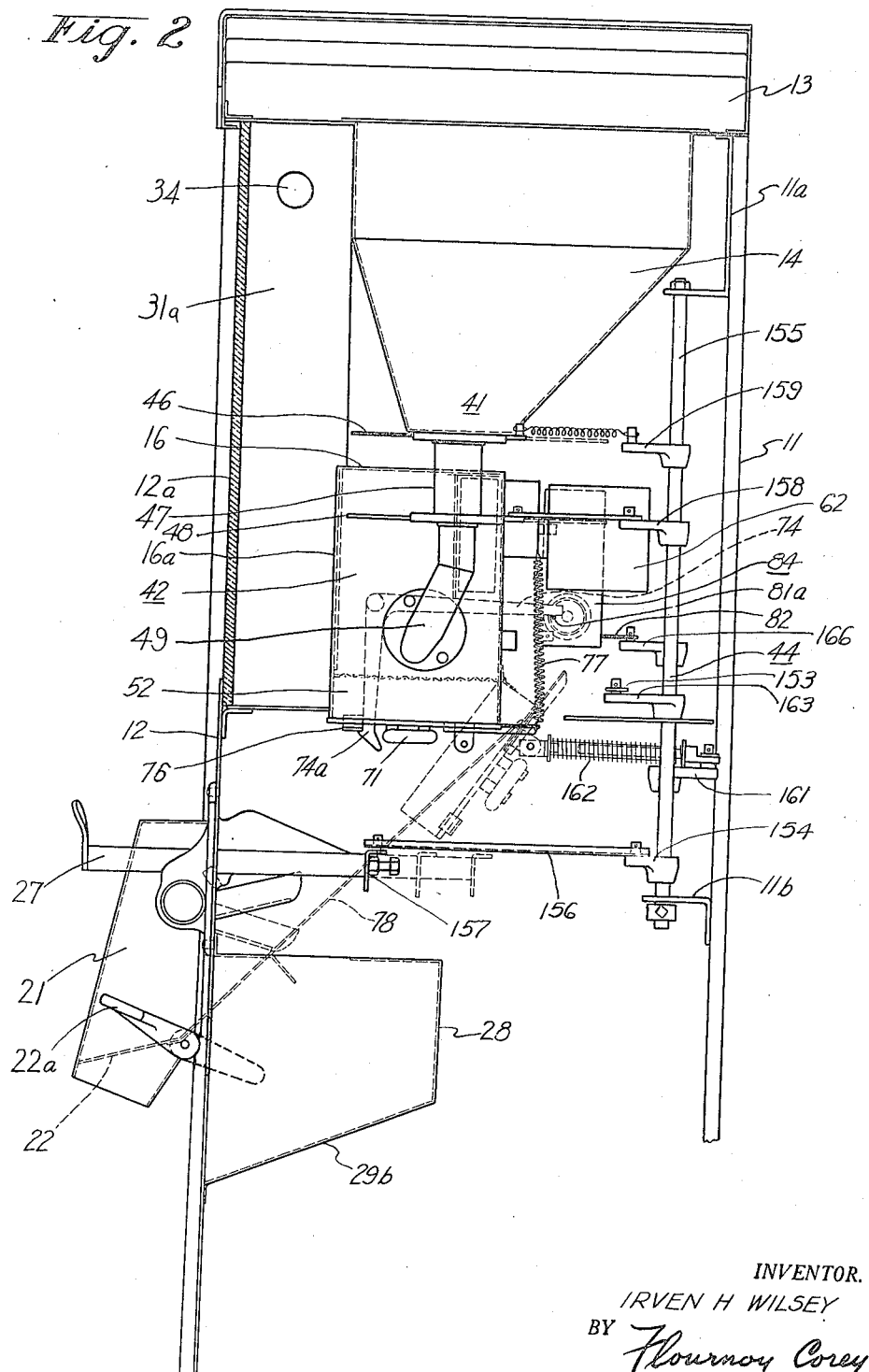

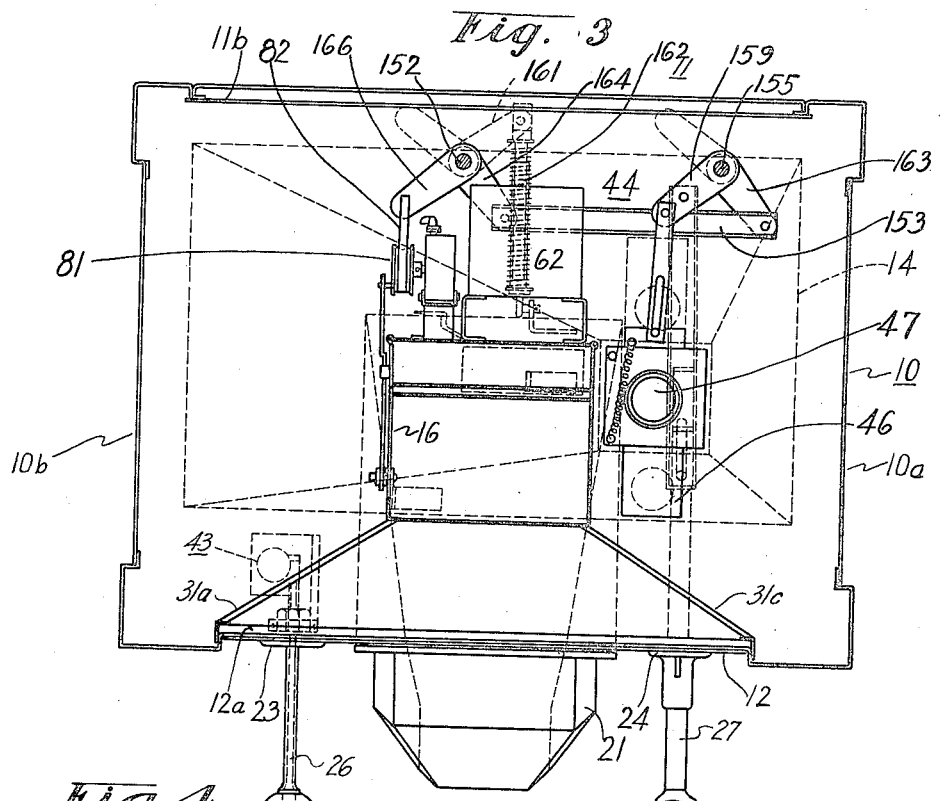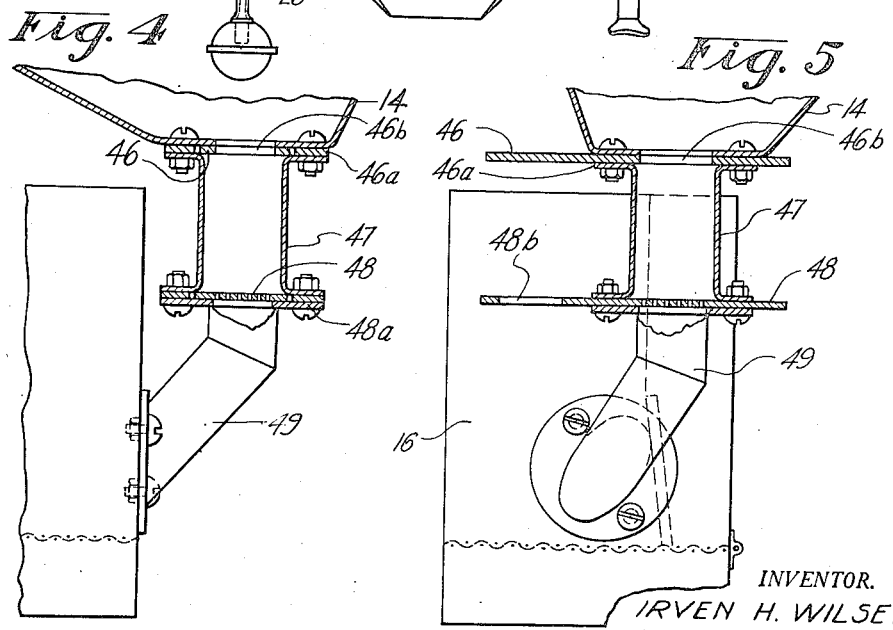

May 13, 1941.　　I. H. WILSEY　　2,241,938
APPARATUS FOR POPPING CORN
Filed Jan. 27, 1938　　6 Sheets-Sheet 4
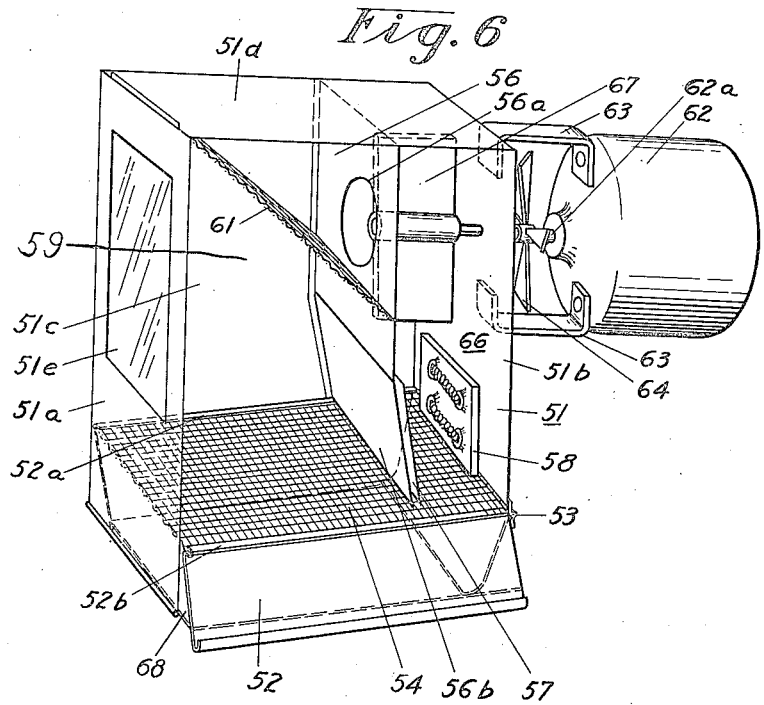
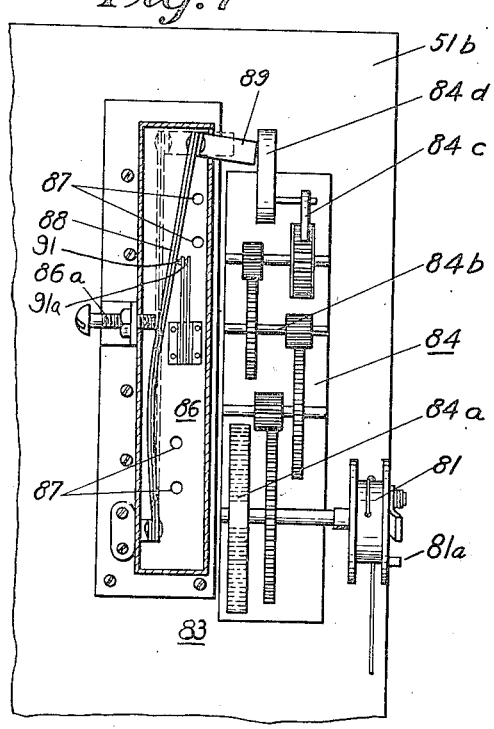
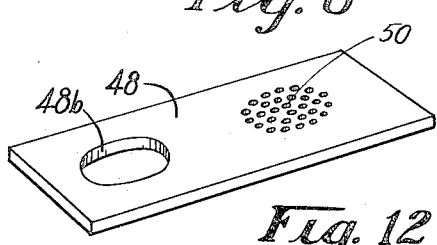
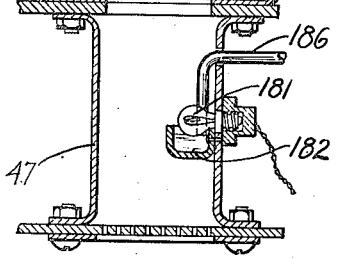
INVENTOR.
IRVEN H. WILSEY
BY Flournoy Corey.
ATTORNEY.

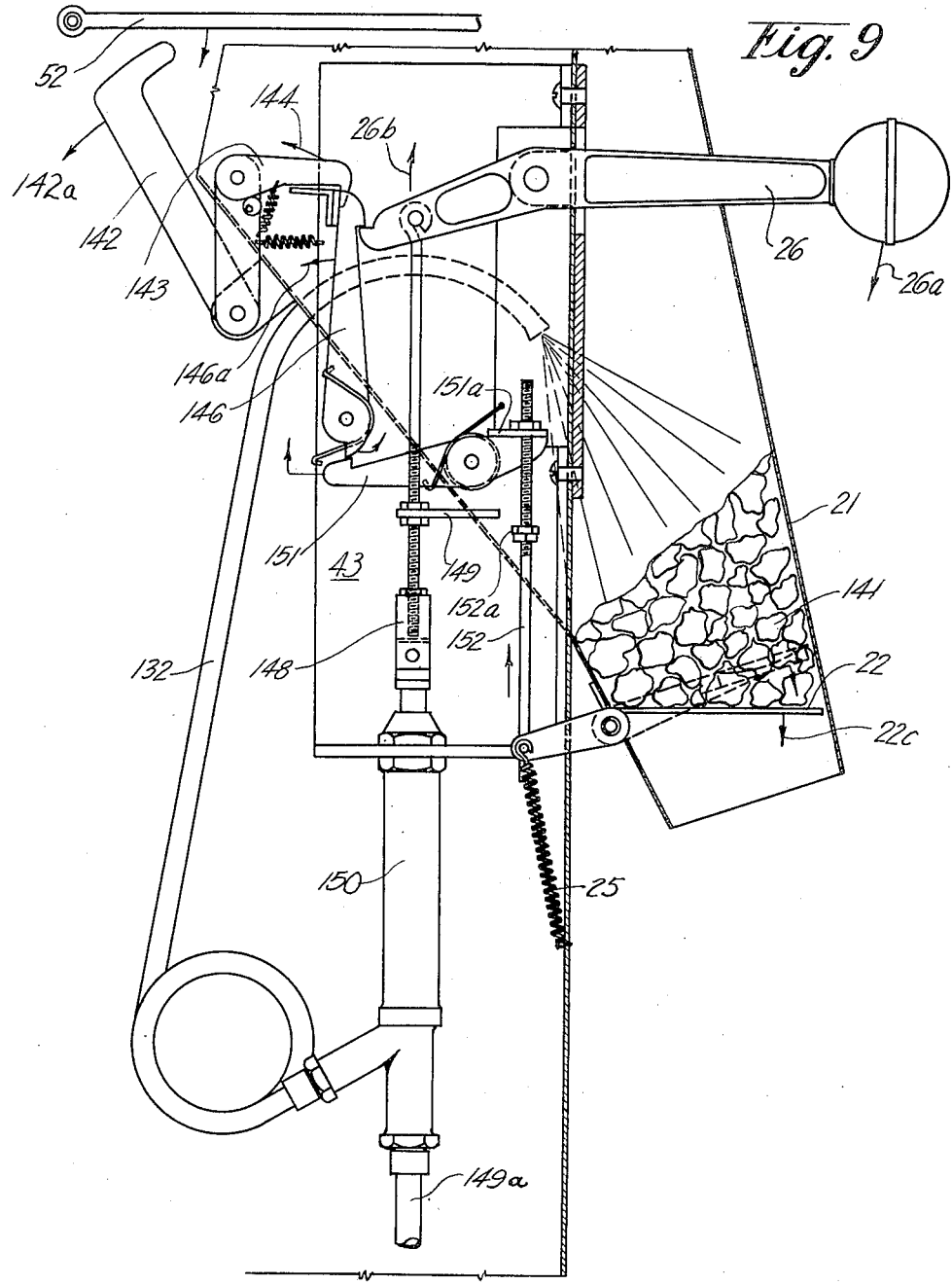

May 13, 1941.  I. H. WILSEY  2,241,938

APPARATUS FOR POPPING CORN

Filed Jan. 27, 1938  6 Sheets-Sheet 6

INVENTOR.
IRVEN H. WILSEY
BY Flournoy Corey
ATTORNEY

Patented May 13, 1941

2,241,938

UNITED STATES PATENT OFFICE 2,241,938

APPARATUS FOR POPPING CORN

Irven H. Wilsey, Chicago, Ill., assignor to Airpops-it, Incorporated, Chicago, Ill., a corporation of Illinois Application January 27, 1938, Serial No. 187,276

19 Claims. (Cl. 53—4)

This invention relates to an apparatus for popping corn and has particular relation to automatic corn popping methods and mechanisms.

Devices of the prior art in which automatic popping of corn is carried out may be divided generally into two classes. One of these classes includes devices in which the corn is popped in a bath of hot oil. Another is a class of devices utilizing hot plates or direct radiation from hot plates. The devices utilizing oil baths are unsatisfactory because the oil becomes rancid and ill-smelling and it is impossible to produce dry corn by this method.

Devices employing hot plates and the like are not satisfactory because fracture of the skin of the kernels of corn is likely to occur before the entire kernel is heated, thus producing small popped kernels of corn of inferior quality.

It is one of the main objects of my invention to provide a popping machine adapted for coin operation, and devices of this character are difficult to control to secure large kernels of popped corn without waste.

I propose to utilize currents of heated air for heating and popping the corn. This insures uniform heating of the kernels of the corn and permits the production of dry corn when desired.

It is among the objects of my invention to provide a popcorn machine in which timing of the popping operation is accurately controlled and is variable to counteract variations in quality of the corn, characteristics of the corn, humidity and temperature of the corn in the popping chamber, variations in voltage, and other variables.

Still another object of my invention is to provide means for preconditioning the corn to be popped by applying moisture to the corn and to provide means for securing large, full-bodied kernels of popped corn under all conditions.

Other and further features and objects of the invention will be more apparent to those skilled in the art upon a consideration of the accompanying drawings and following specifications, where is disclosed several exemplary embodiments of the invention, with the understanding, however, that such changes may be made therein as fall within the scope of the appended claims, without departing from the spirit of the invention.

In said drawings:

Figure 2 is a view, partly in side elevation and partly in section, of the device shown in Figure 1, illustrating the mechanism of the corn popping machine.

Figure 3 is a top plan view, partly in plan and partly in section, of the device shown in Figures 1 and 2.

Figure 4 is a fragmentary view in front elevation of the corn measuring means employed in a device constructed according to my invention.

Figure 5 is a view in side elevation of the device shown in Figure 4.

Figure 6 is a view in perspective of the corn popping mechanism with portions of the device broken away to show details of construction.

Figure 7 is a view in rear elevation, partly in section and partly in elevation, of one form of temperature control timing device for use in connection with my machines.

Figure 8 is a view in perspective of the lower gate of the device shown in Figures 4 and 5.

Figure 9 is a view in side elevation illustrating the pump employed for seasoning corn popped according to my process and utilizing means constructed according to my invention.

Figure 12 is a fragmentary view, partly in elevation and partly in section, of a modified form of corn pre-conditioning device.

Figure 1:
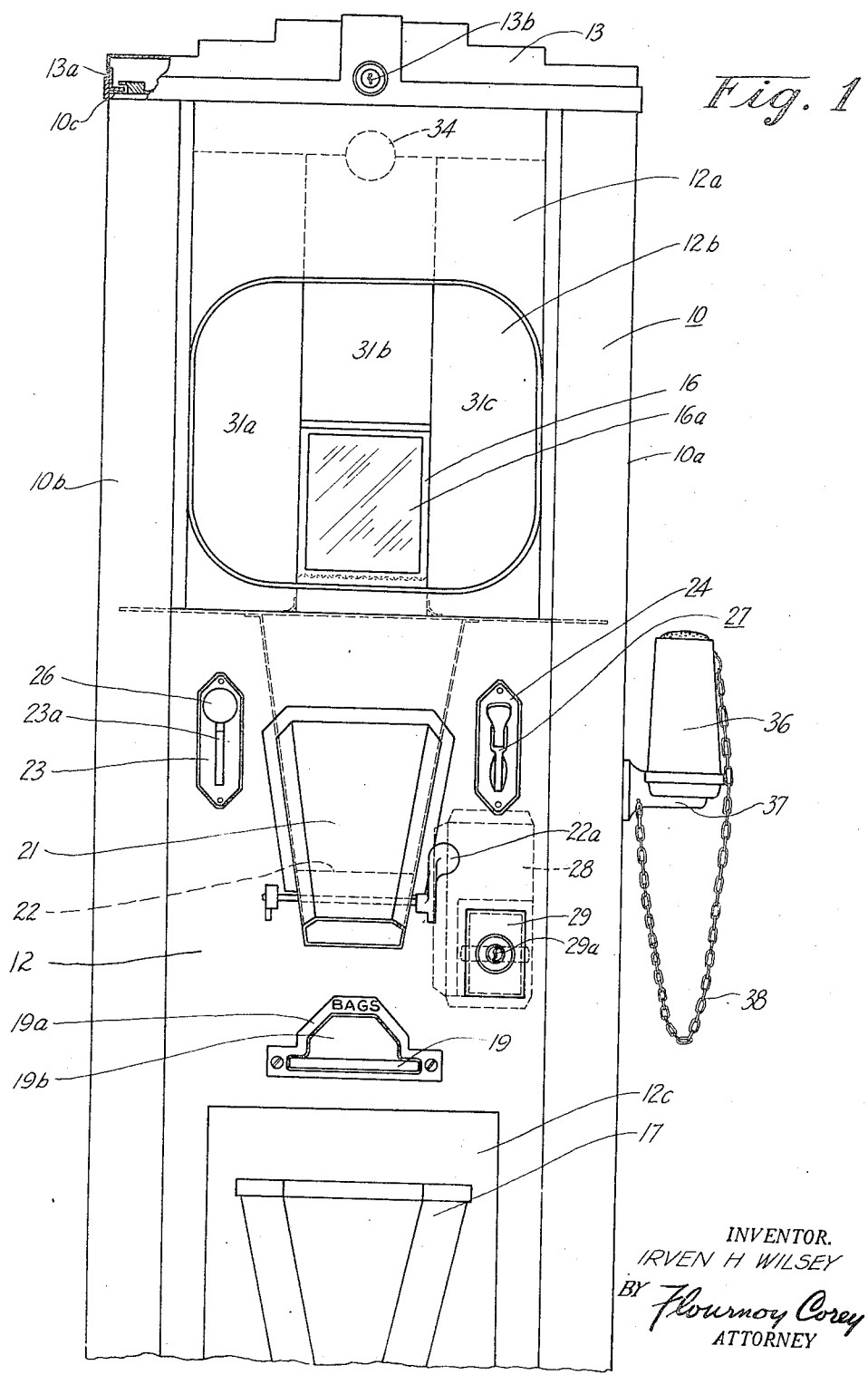
Figure 1 is a front elevational view of a machine constructed according to one embodiment of my invention.

Referring now more particularly to Figures 1, 2 and 3, of the drawings, a machine constructed according to a preferred embodiment of my invention includes a cabinet indicated generally at 10 and consisting of side panels 10a and 10b, preferably of sheet metal, joined together by various spot-welded cross members, such as the members 11a and 11b at the rear end, and by the front plate 12 at the front of the machine. The rear panel, indicated generally at 11, may be removed for repairing and adjusting the mechanism of the machine from the rear.

The top of the cabinet is covered by the ornamental cover 13. This cover may be removed by sliding it forward, the interfitting flanges 10c and 13a acting to hold the top in place on the cabinet and the lock 13b serving to latch and lock the top in place. The cap 13 is made removable in order to load the hopper 14 with popcorn, as will hereinafter more particularly appear.

The upper portion of the machine, at the front thereof, is covered by a removable glass panel 12a, the panel being painted over at the upper portion thereof with a semi-transparent paint, and the lower portion being clear, as indicated at 12b, so that the interior of the popper itself may be seen by the customers. The popper 16 has a heat-resistant glass front 16a and the entire popping operation may be seen by the customer. The kernels of corn will drop down before him, will be heated and exploded one by one. The exploded kernels of corn will dance in the ascending current of air and, inasmuch as the interior of the machine is lighted, the popping process makes a very attractive display, which is undoubtedly no small factor in creating sales. The lower portion of the front of the cabinet is closed by a panel 12c which carries a refuse container 17, and removal of this panel 12c permits replenishing of the seasoning liquid in the jar 18 and replacement of the sacks.

A slot is provided at 19 for removal of the sacks or bags one by one, an ornamental rim 19a being provided having the opening 19b therein for insertion of the fingers to remove the bags.

A delivery hopper 21 is secured to the front of the panel 12, and this delivery hopper is closed at its lower end by a gate 22, the gate being operated by a gate lever 22a. The gate is held in closed position by spring 25, shown in Figure 9.

Escutcheon plates 23 and 24 are provided on the front of the panel 12, the plate 23 being slotted, as indicated at 23a, to permit vertical movement of the seasoning lever 26, and the plate 24 being adapted to receive the coin slot, indicated generally at 27.

Coins from the chute 27 drop into the coin box 28. Access to this coin box may be had through the door 29, the door having a lock indicated at 29a. The coin box may be either a box having a sloping bottom 29b in order to facilitate removal of the coins, or the door 29 may be a part of a coin drawer, in accordance with conventional practice.

Mirrors are provided at 31a, 31b, and 31c to close off the interior of the back of the machine, and reflect light from the electric bulb 34 uniformly over the whole inclosure to improve the attractiveness of the machine and illuminate the interior of the popper.

Salt for seasoning the corn after popping is provided by means of a salt cellar 36 which is supported on a bracket 37 on the side of the machine. The salt cellar is preferably chained in place by a chain 38.

Now referring more particularly to Figures 2 to 6, the corn popping mechanism includes a loading and measuring means indicated generally at 41, the corn popping means indicated generally at 42, the corn seasoning means indicated generally at 43, and the control and actuating mechanism indicated generally at 44.

The batch measuring means indicated at 41 includes the hopper 14 which is of sufficient size to hold eighteen to twenty pounds of corn, which is a sufficient supply for approximately three hundred bags of popped corn. As has been previously stated, this hopper may be filled from the top by removing ornamental cover 13. The bottom of this hopper is closed by means of a gate plate 46 which is received in gate plate guide 46a.

A short flanged tube 47 is provided below the upper gate 46, and a lower gate 48 is supported at the lower end of this tube by a guide 48a. This lower gate is adapted to close off the lower end of the tube. The tube 47 acts as a volume proportioning cup for measuring the quantity of corn delivered into the popper for each operation. Different sizes of tubes may be substituted to measure out different quantities of corn as desired. An opening 46b is provided in the upper gate plate 46 at one end thereof, and a similar opening 48b is provided in the gate plate 48 at the other end thereof.

When the gate plates 46 and 48 are in their normal position illustrated in Figures 4 and 5, corn from the hopper 14 fills the measuring cup 47. On movement of the gate plates 46 and 48 from left to right, by means of mechanism 44, as will be hereinafter more particularly described, the bottom of the hopper 14 will be closed off by the gate 46 and the measuring cup 47 will be opened at the bottom by the opening 48b in gate plate 48 and a measured batch of corn will be permitted to drop down the delivery chute 49 into the popper 16, which constitutes part of the popping mechanism indicated generally at 42.

It is one of the important features of my invention that the corn in the measuring cup 47 is pre-prepared or preconditioned by heating it and adding moisture to it. This is accomplished by a very simple means which includes conducting heat and moisture from the chamber in which the corn is popped to the batch of corn in the measuring tube. The hot air in the popper furnishes the heat and the means for conveying the heat. The corn being popped releases moisture in the form of steam and this steam is readily conducted to the measuring tube 47 by the direct connection afforded by the delivery spout 49. All that is necessary is to provide openings 50 in the gate 48 to let the hot air and steam into the measuring tube. The hot air and steam heats and moistens the corn in the measuring tube and not only saves time in popping the corn but adds the moisture which assists in causing steam to cause the kernels to explode readily and with great size.

The popper 42 is a rectangular box-like structure indicated generally at 51 and having front wall 51a, rear wall 51b, side walls 51c, and top cover 51d. The front wall 51a is provided with a heat resistant glass view plate 51e to permit inspection of the interior of the popper. The bottom of the popper consists of a tray-like member 52 engaged to the back wall 51b of the main portion of the popper by means of the hinge 53 to permit the tray to be dropped to the open or discharge position indicated in dotted lines in Figure 2. The upper surface of the tray-like member, termed the popper door, is provided with a screen 54. This screen 54 is supported by guide members 52a and 52b so that it may be removed from the popper door. When the door is in the closed or upper position, the interior of the popper is closed and corn from the chute 49 will be deposited on the screen 54.

The interior of the popper is divided by a vertical transverse partition indicated at 56. This partition has a circular opening 56a therethrough. The lower portion of the partition 56 is inclined slightly, as indicated at 56b, to prevent "arching" of the popped corn. A spaced additional partition 57 is located adjacent to the lower portion of the partition 56 on the rear thereof, and this partition acts as a means for preventing radiant heat from the heater coil 58 from passing into the popping chamber, indicated at 59.

An inclined screen 61 is provided in the upper part of the chamber 59 and extending from the upper front corner of the popper to the partition 56 below the opening 56a to prevent corn from passing on through the opening 56a. The motor 62 is supported on the rear of the popper by means of the brackets 63 and the shaft 62a of this motor is provided with a motor cooling fan 64. The shaft 62a projects through the rear wall of the popper and into the chamber 66 in the rear of the popper.

A blower blade 67 is secured on the end of the shaft 62a within the chamber 66, and on rotation of the motor the air from the chamber 59 will be drawn through the opening 56a into the chamber 66 and driven down past the heater coil 58 through the chamber 68 within the door 52 and up through the screen 54 and into the chamber 59. It is apparent that a closed circuit of air is circulated through the popper by means of the blower 67 and that each time the air passes the heater 58 its temperature is raised until the heat losses equal the heat being supplied.

In the cycle of operation of the machine, the door 52 is closed by means of the operating mechanism 44 which is described hereinafter in detail and which is operatively connected with the coin chute 27. The closing of this door closes the mercury switch 71, attached to the bottom of the door, to close a circuit, hereinafter more particularly described, to energize the motor 62 and the heater coil 58. A timing mechanism 84 on the back of the popper 42, later described in detail, after the elapse of a certain period of time, causes a pin 81a to strike a door latch lever 74, which is provided with a latch portion 74a, and this latch portion will disengage from a latch dog 76 on the door 52. The door drops of its own weight or by means of the spring 77, the popped corn is discharged down the delivery chute 78, and the mercury switch 71 is opened to break the circuit to the motor and heater. The chute 78 may be perforated to permit unpopped kernels and the like to drop through into the base of the machine.

In order to pop all or nearly all of the corn a certain number of heat units are required to heat the air within the popper to take care of heat losses to bring the popper, the air within the popper, and the batch of corn up to the required temperature and to pre-condition or pre-prepare the next batch of corn. The quantity of heat required to heat the corn to pop it will be substantially constant except for variations in the characteristics in the various corn used.

Additional heat is required if the popper is cold, as for instance when a considerable interval has elapsed since the last batch of corn was popped, than when the popper is hot, as occurs when the interval is short. I provide means for automatically supplying this deficiency of heat as well as the correct popping interval by means of the thermostatically controlling clock mechanism mounted on the back of the heater compartment, as indicated at 83 in Figure 7. The timing device, indicated generally at 84, includes a spring 84a for driving the device, a train of gearing indicated generally at 84b, an escapement 84c, and a balance wheel 84d. In this timer, regulation of the length of time allowed for popping after the chamber has been brought up to the proper initial temperature is accomplished by varying the amount of winding given the winding drum 81. This, in turn, is accomplished by lengthening or shortening the link 82 which winds this winding drum.

In order to provide for the supply of additional heat to the popper to secure the proper initial temperature, the thermostat 86 is utilized. This thermostat 86 is fastened on the rear wall 51b of the popper box, and both conduction through the metal of the box and thermostat, and convection currents through the openings 87 in the wall, into the interior of the box are employed for activating the thermostat. When the interior of the box has been brought up to the proper temperature, the bi-metal strip 88 will have moved to the left to remove the lock or brake 89 to release the balance wheel 84d and to permit movement of the clock escapement mechanism. The member 86a is an adjustment for securing the proper initial popping temperature. The bi-metal strip 88 might carry a contact, indicated at 91, which, together with the spring follower contact 91a, may be utilized to limit the maximum heat input into the heater element.

The heater elements 58 are placed in series electrical connections with a source of power, the thermostat contacts 91 and 91a, and with the mercury tube 71. The lamp 34 is preferably placed in series with the mercury tube but in parallel with the heater coils and thermostat.

A corn popping means constructed according to my invention will provide dry popped corn, but some individuals prefer a corn which is buttered or seasoned. The device illustrated more particularly in Figure 9 is a means which I have provided for seasoning the corn at the option of the customer. If seasoning is to be provided, there must be incorporated into the popper a mechanism to prevent the customer from obtaining an oversupply of seasoning. The device illustrated in Figure 9 accomplishes this purpose.

When the popped corn has been popped and discharged into the delivery chute 21 and is resting on the gate 22, as indicated at 141, and as the popper bottom 52 drops down at the completion of a popping operation, it strikes the lever 142 to drive it in the direction illustrated by the arrow 142a. This causes lever arm 143 to move rearwardly, as indicated by the arrow 144, to move latch 146 in the direction of the arrow 146a, thereby unlatching pump handle 26. The customer may then move the handle downwardly, as indicated by arrow 26a, to move the rear end of the lever upwardly, as indicated by arrow 26b, and this upward movement of the handle 26 pulls upwardly on pull rod 148 to draw up a supply of seasoning through the tube 149a from bottle 18 into the pump 150. On continued downward movement of the handle 26, pump rod 148 rises and trip bar 149 strikes the front end of lower latch 151, which releases latch lever 146 which has previously been latched by levers 151. When the delivery chute gate 22 is moved downwardly, as indicated by the arrow 22c, trip rod 152 rises and the lock nuts 152a strike the ear 151a of lever 151 to alternately release latch 146 whose motion has been previously described, which in turn locks handle 26 for the next operation.

In the embodiment of my invention here shown, the operations of measuring out a batch of corn, of winding the timing device and closing the bottom of the popper, are accomplished through the agency of the mechanism 44 which is actuated by the coin chute 27. Two vertical shafts, 155 and 152, are connected by a cross link 153 to cause simultaneous movement thereof. A lever 154 is connected by means of a link 156 to a bracket 157 on the inner end of the coin chute 27. The lever 154 is approximately parallel to levers 158 and 159 on the same shaft. The levers 158 and 159 are connected to lower and upper measuring gate plates 48 and 46 respectively, and when the crank 154 is rotated to rotate shaft 155 in the clockwise direction (see Fig. 3) by movement of the coin chute 27 inwardly, the upper gate is shut off and the lower gate opened to permit a batch of corn to be dropped into the popper.

Another lever 161 is provided on the shaft 151 and this lever is connected by a telescopic link 162 to the hopper bottom 52 so that inward movement of the coin chute 27 closes the hopper bottom. Closing of the popper bottom or door causes the closing of the switch 71 to energize the blower motor and to energize the heater element. The door is latched in place by latch 74a. Still another crank or lever arm 163 is provided on the shaft 155 and this lever is connected to the cross link 153, which in turn is connected to a lever 164 on the shaft 152. Movement in the clockwise direction of the shaft 155 as viewed in Figure 3 thus causes like movement of shaft 152.

A lever 166 is provided on the shaft 152 and this lever is connected to the flexible tape or chain member 82 for winding the timing mechanism 84. After completion of the popping operation the pin 81a kicks out the bell crank 74 to release the popper bottom to discharge the popped corn into the delivery chute. At the same time the switch 71 is opened to de-energize the motor and de-energize the main heater. The corn can then be seasoned if desired and a paper sack 171 slipped over the spout of the delivery chute 21. The gate plunger is opened by the lever 22a and the corn discharged into the bag.

Figure 10:
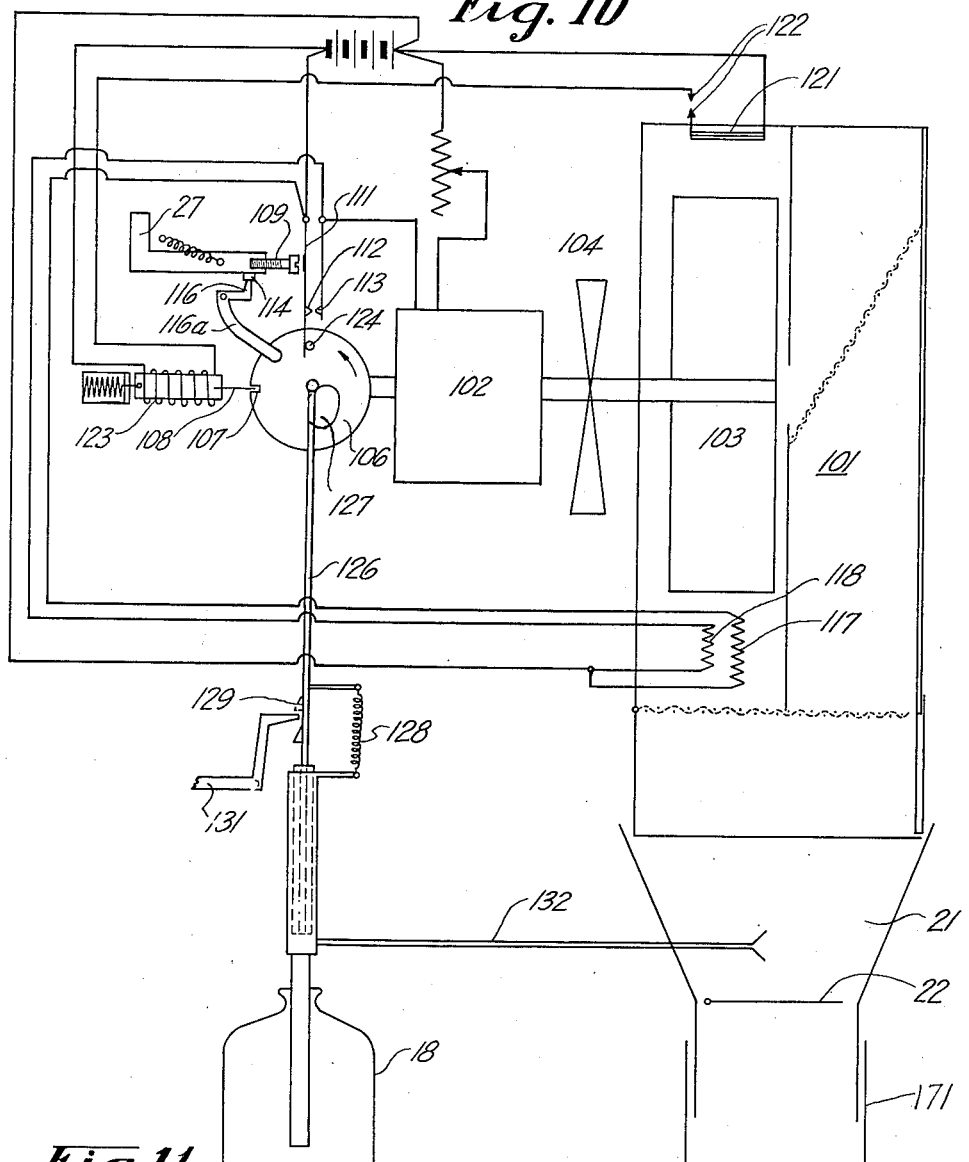
Figure 10 is a schematic diagram illustrating another form of a temperature controlled timing device suitable for my machine.

The heating control means, illustrated in Figure 7, is one method of supplying the required heat necessary for popping corn under all conditions. Another method and means for controlling the supply of heat is illustrated in Figure 10. In this device the popper shown at 101 is substantially the same as the popper illustrated in Figure 6. The motor, blower, and fan, illustrated at 102, 103 and 104, are substantially the same except that the motor 102 drives a timing disk or slip disk 106 through conventional reduction gearing. This disk 106 is frictionally mounted on the reduction gearing so that if any locking means, such as the slot and pin arrangement illustrated at 107 and 108, is engaged, the disk will slip on its drive shaft. As soon as the locking arrangement is released the disk will rotate with the shaft.

The cycle of operation of this device, shown in Figure 10, is begun by the coin chute 27. When this coin chute is pushed in by the customer the adjustable push rod 109 strikes against the flexible spring 111 to close contacts 112 and 113. At the same time the dog 114 passes beyond the latch 116 and the latch engages the side of the dog to hold the push rod 109 in engaged position to close contacts 112 and 113. The contacts 112 and 113 close circuits leading through the main heater coil 117 and the motor 102 to energize the motor and main heating coil. The auxiliary heater coil 118 is energized at all times and this constant heating coil maintains the interior of the popper at a moderate warm temperature.

If the temperature of the popper 101 is low, as for instance when a considerable length of time has elapsed since the last batch of corn was popped, the thermostat 121, located within the popper, will be relatively cold and the contacts 122 will be open. As soon as the interior of the box has reached a sufficiently high temperature, the thermostat 121 will cause the contacts 122 to close to energize the electro-magnet 123 to withdraw the locking pin 108 from the slot 107 and permit the slip disk 106 to rotate.

Shortly after the slip disk 106 starts to rotate the pin 124 will strike the arm 116a of latch 116 and cause the latch 116 to be disengaged from the disk 114 to permit the coin chute 27 to return to its normal position. Inasmuch as the pin 124 is no longer in contact with the arm 111 the contacts 112 and 113 will remain closed to maintain energization of the heater 117 and motor 102.

When the slip disk 106 has made one complete revolution, the pin 124 strikes the arm 111 to open the contacts 112 and 113 to disengage the heater 117 and motor 102. The rotation of the slip disk 106 may also be employed to unlatch the popper door at the end of the popping period. The disk 106 may also be employed to lift the plunger 126 through the agency of the cam 127 against the spring 128 and latch the seasoning plunger in the upper position, indicated at 129. When the lever 131 is moved by means of pump lever 26, the latch 129 is disengaged to permit the plunger to descend to drive seasoning liquid through the tube 132 into the delivery chute 21.

Figure 11:
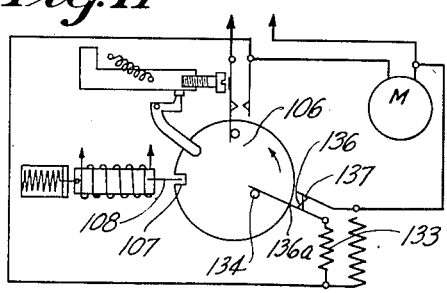
Figure 11 is a schematic diagram illustrating a modified form of temperature controlled timing device for my machine.

In this last described system and means, the auxiliary heater 118 is on at all times, but it is possible to utilize the same structure shown in Figure 10 to energize an auxiliary heater 133. This apparatus is illustrated in Figure 11. In this device a second pin 134 keeps contacts 136 and 137 normally closed when lock 107 and 108 are engaged. As soon as the slip disk 106 begins to rotate, the auxiliary heating element is disconnected because pin 134 is carried beyond the lever arm 136a. In this latter structure the auxiliary heating coil is employed as an auxiliary means for heating the popper when the popper is cold, or when the popper has insufficient heat to begin the popping cycle.

It is apparent that various modifications of my invention may be made by those skilled in the art. For instance I may utilize a means for pre-preparing or preconditioning the corn illustrated in Figure 12 and employing a heating unit, such as an electric light 181, within the measuring chute 47. This unit is provided with a small cup 182 for receiving water or other liquid delivered to the cup by means of the tube 186. The corn in the measuring cup 47 will be heated and moistened by the vapor produced by the heating element.

These and other modifications may be made by those skilled in the art without departing from the spirit and scope of my invention as set forth in the appended claims.

I claim as my invention:

1. In a corn popping machine, means for popping a batch of corn, means including a perforate gate for measuring out the next batch of corn to be popped, and means for conducting a part of the heat and moisture from the corn being popped through the perforate gate to the next batch.

2. In a corn popping machine, a means for storing corn, means for popping a batch of corn, and means including a perforate shutter in the measuring means for utilizing the moisture and steam from the corn being popped to pre-condition the stored corn.

3. In a corn popping machine, a hopper for storing corn, a popper for popping the corn, and a direct connection from the popper to the hopper including a conduit, a measuring means, and a perforate partition member therebetween, said conduit adapted to conduct heat and moisture from the popper to the measuring means and the hopper.

4. In a batch type corn popping device, a coin operated corn measuring means, a perforated support for the batch of corn being popped, means for supplying a heated air stream to the corn on the support, and means for supplying a predetermined amount of heat to the air stream.

5. In a corn popping machine, means for popping a batch of corn, means including a perforate gate for measuring out the next batch of corn to be popped, and means for conducting heat and moisture from the popping corn through the perforate gate to the next batch of corn.

6. In a corn popping device, a popping chamber, an air heating chamber, a main heater element therein, means for controlling this element, an auxiliary heater element, and thermostat means for energizing the auxiliary heater when the air heating chamber cools beyond a predetermined point.

7. In a corn popping device, a popping chamber, an air heating chamber, a main heater element therein, means for controlling this element, an auxiliary heater element, and means for energizing this element during the first portion of the cycle of operation of the device.

8. In a batch-process, intermittently-operated corn popping device, means for measuring a batch of corn, and means for preconditioning the corn in the measuring means, including a heater vaporizing device for supplying heat and moisture to the corn in the measuring device.

9. In a corn popping device of the type in which heat is transferred to the corn from a heater element by a blast of air, a main heater element for furnishing heat for popping the corn, and an auxiliary heater for maintaining the temperature of the interior of the popper at greater than ambient temperature.

10. In a corn popping device of the type in which heat is transferred to the corn from a heater element by a blast of air, a main heater element adapted to be energized only when corn is to be popped, and an auxiliary heater element energized at all times.

11. In a batch-process corn popper, a popping mechanism, a timing mechanism, a motor for driving the timing mechanism including a slip disc, holding means for preventing rotation of the disc, and temperature controlled means for releasing the holding means when the popping mechanism has been heated to popping temperature.

12. In a batch-process, intermittently-operated, corn popping device, a popping chamber, means for supplying heat to same, thermostatic means for controlling the supply of heat to provide a minimum initial temperature in the popping chamber, and control means, operative only after the minimum initial temperature has been reached, for causing a definite quantity of heat to be supplied to the popping chamber.

13. In a batch-process, intermittently-operated, corn popping device, a popping chamber, heater and thermostatic means for causing the air within the chamber to be heated to a predetermined temperature, control means for energizing the heater means to supply a definite quantity of heat in the popping chamber after the predetermined temperature has been reached, and means for discharging the corn from the popper after the definite quantity of heat has been supplied.

14. In a batch-process, intermittently-operated corn popping machine, a popping chamber, heater means, means for controlling said heater means to supply a given quantity of heat to the popping chamber when the machine is hot, and thermostatic means to control the heater means to supply additional heat when the machine is cold to raise the initial temperature in the popping chamber to a predetermined temperature.

15. In a batch-process, intermittently-operated corn popping machine, a popping chamber, means for supplying heat to the chamber, means for controlling the heat supply to introduce a definite quantity of heat into the popping chamber when the interval elapsing after the last batch is short, and control means for introducing additional heat into the popping chamber when the interval elapsing after the last batch is long, said control means including a thermostat connected to energize the heat supply means when the initial temperature of the popping chamber is low.

16. In a batch-process, intermittently-operated corn popping device, means for measuring a batch of corn including a measuring container, gates at the upper and lower ends thereof, and means for selectively opening the top gate and closing the bottom gate, or closing the top gate and opening the bottom gate, the bottom gate having a perforate portion positioned below the container when the bottom gate is in the closed position to permit heated and moistened air to pass upwardly through a measured batch of corn.

17. In a corn popper, a popping chamber, a heater and blower chamber adjacent thereto, a tray-like hinged bottom enclosing and connecting the bottoms of the two chambers, a screen on the tray-like bottom to support corn within the popping chamber, and means for releasing the bottom to release the corn after it is popped.

18. In a corn popper, a popping chamber, a heater and blower chamber adjacent thereto, a tray-like hinged bottom enclosing and connecting the bottoms of the two chambers, a screen on the tray-like bottom to support corn within the popping chamber, means to permit air to pass from the top of the popping chamber to the blower and heater chamber, means to prevent popped corn from passing into the blower and heater chamber, and means for releasing the hinged bottom to release corn after it is popped.

19. In a corn popping machine, a popping chamber, an auxiliary heater chamber, a screen covering the bottom of the heater chamber, a tray-like member supporting the screen and supported in hinged relation to the chambers, said tray-like member forming a conduit for conducting air from one chamber to the other, a blower in one chamber for circulating air, means in the heater chamber for heating air, means for releasing the hinged member when enough heat has been given off by the heater means to pop a charge of corn placed in the popping chamber, a chute for receiving corn discharged from the popping chamber, means for seasoning the corn, and means for releasing the corn from the chute after it has been seasoned.

IRVEN H. WILSEY.